(12) United States Patent
El Essaili et al.

(10) Patent No.: US 12,547,145 B2
(45) Date of Patent: Feb. 10, 2026

(54) HUMAN ACTION RECOGNITION AND ASSISTANCE TO AR DEVICE

(71) Applicant: Telefonaktiebolaget LM Ericsson (publ), Stockholm (SE)

(72) Inventors: Ali El Essaili, Aachen (DE); Esra Akan, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 433 days.

(21) Appl. No.: 17/909,102

(22) PCT Filed: Mar. 4, 2020

(86) PCT No.: PCT/EP2020/055725
§ 371 (c)(1),
(2) Date: Sep. 2, 2022

(87) PCT Pub. No.: WO2021/175420
PCT Pub. Date: Sep. 10, 2021

(65) Prior Publication Data
US 2023/0105603 A1    Apr. 6, 2023

(51) Int. Cl.
*G05B 19/4063* (2006.01)

(52) U.S. Cl.
CPC ............ *G05B 19/4063* (2013.01); *G05B 2219/34427* (2013.01)

(58) Field of Classification Search
CPC ...... G05B 19/4063; G05B 2219/34427; G05B 19/4183; G05B 19/41805;
(Continued)

(56) References Cited

U.S. PATENT DOCUMENTS

2010/0057243 A1 * 3/2010 Stencel ............ G05B 19/41805
  700/95
2017/0316610 A1 * 11/2017 Lin ...................... G02B 27/017
(Continued)

FOREIGN PATENT DOCUMENTS

DE      102 15 885 A1     10/2003

OTHER PUBLICATIONS

International Search Report and Written Opinion with Transmittal dated Nov. 30, 2020 in International Application No. PCT/EP2020/055725 (13 pages).
(Continued)

*Primary Examiner* — Thomas C Lee
*Assistant Examiner* — Tyler Dean Hedrick
(74) *Attorney, Agent, or Firm* — Rothwell, Figg, Ernst & Manbeck, P.C.

(57) ABSTRACT

A method for operating a monitoring unit (100), configured to monitor a manipulation of at least one object (40, 45) by a user, the method comprising: —receiving, via a cellular network (60), actual user position data comprising an actual position of at least one portion of user used to manipulate the at least one object, and actual object position data comprising an actual position of the at least one object, —matching the actual user position data to predefined user position data provided at the monitoring unit (100), the predefined user position data indicating a correct position of the at least one portion of the user for manipulating the at least one object, and matching the actual object position data to predefined object position data provided at the monitoring unit, the predefined object position data indicating a correct position of the at least one object, —determining, based on the matching, whether the manipulation of the at least one object by the at least one portion of the user is correct or not.

19 Claims, 10 Drawing Sheets

(58) Field of Classification Search
CPC ........... G05B 2219/31027; G05B 2219/31046; G05B 2219/32005; G05B 2219/32014; Y02P 90/02
See application file for complete search history.

(56) References Cited

U.S. PATENT DOCUMENTS

| | | | | |
|---|---|---|---|---|
| 2018/0277015 | A1* | 9/2018 | Casella | G06F 9/453 |
| 2019/0243344 | A1 | 8/2019 | Bauer et al. | |
| 2020/0293019 | A1* | 9/2020 | Putman | G06N 3/006 |
| 2022/0375056 | A1* | 11/2022 | Weiss | G06T 7/11 |

OTHER PUBLICATIONS

Zhang, W. et al., "On the Networking Challenges of Mobile Augmented Reality", VR/AR Network '17, Aug. 25, 2017, Los Angeles, CA, USA, https://doi.org/10.1145/3097895.3097900 (6 pages).

Liu, Q. et al., "An Edge Network Orchestrator for Mobile Augmented Reality", IEEE INFOCOM 2018—IEEE Conference on Computer Communications, pp. 756-764 (9 pages).

Liu, Q. et al., "DARE: Dynamic Adaptive Mobile Augmented Reality with Edge Computing", 2018 IEEE 26th International Conference on Network Protocols (Sep. 2018) (11 pages).

Chen, Z. et al., "An Empirical Study of Latency in an Emerging Class of Edge Computing Applications for Wearable Cognitive Assistance", SEC '17, Oct. 12-14, 2017, San Jose / Silicon Valley, CA, USA (14 pages).

Ge, L. et al., "Robust 3D Hand Pose Estimation in Single Depth Images: from Single-View CNN to Multi-View CNNs", Institute for Media Innovation, Nanyang Technological University, Singapore, pp. 3593-3601 https://openaccess.thecvf.com/content_cvpr_2016/papers/Ge_Robust_3D_Hand_CVPR_2016_paper.pdf (2016) (9 pages).

* cited by examiner

HUMAN ACTION RECOGNITION AND ASSISTANCE TO AR DEVICE

CROSS REFERENCE TO RELATED APPLICATIONS

This application is a 35 U.S.C. § 371 National Stage of International Patent Application No. PCT/EP2020/055725, filed Mar. 4, 2020.

TECHNICAL FIELD

The present application relates to a method for operating a monitoring unit configured to monitor a manipulation of at least one object. Furthermore, the corresponding monitoring unit is provided, a viewing apparatus for a user and a computer program comprising program code, a carrier comprising the computer program and a system comprising the monitoring unit and the viewing apparatus.

BACKGROUND

Smart factories of Industry 4.0 will be enriched with wireless technologies to improve the overall factory performance, minimize production errors, and reduce costs and complexity. 5G networks will be essential for data intensive smart factories, providing wide-area factory coverage, high throughput, and low latency. To assist the workers in real-time, augmented reality (AR) technology is used with the computational support from the edge servers. For instance, AR can be used to detect and predict errors, provide expert support to on-field workers leveraging AI-enabled automated decision making at the edge.

In smart factories, e.g. car productions, car assembly at production lines involves human workers. Workers typically get task instructions on display which are mounted at the workplace (e.g. during assembly). AR technology can be used to provide real-time instructions to workers as they approach specific objects (e.g. axels). Workers wearing AR glasses can also get information specific to objects for quality inspection.

Zhang et al. [W. Zhang, B. Han, and P. Hui, "On the networking challenges of mobile augmented reality," in Proceedings of the Workshop on Virtual Reality and Augmented Reality Network, NY, USA, ACM, 2017.] analyzed cloud-based AR systems by dividing the end-to-end delay of a typical mobile AR system into different tasks. They discussed what to offload, where to offload, what protocol to use and how to reduce latency. They concluded that object recognition task accounts for one third of the end-to-end latency and should be offloaded due to its computation and database requirements. Liu et al. [Q. Liu, S. Huang, J. Opadere and T. Han, "An Edge Network Orchestrator for Mobile Augmented Reality," IEEE INFOCOM, Honolulu, Hi., 2018.] proposed FACT (fast and accurate object analytics) algorithm for mobile augmented reality (MAR). They targeted a MAR system which includes multiple MAR clients and multiple edge servers. The proposed algorithm fixes the server assignments and frame resolutions sequentially in order to minimize latency and maximize accuracy. The proposed algorithm is applied at a network node considering computational complexity, object accuracy and network latency for each object. Liu and Han [Q. Liu and T. Han, "DARE: Dynamic Adaptive Mobile Augmented Reality with Edge Computing," 2018 IEEE 26th International Conference on Network Protocols, Cambridge, 2018.] designed DARE (dynamic adaptive AR over the edge) protocol which dynamically minimizes service latency and maximizes Quality of Augmentation for MAR users using edge computing. Quality of augmentation is defined as an average precision of multiple visual detection algorithms. In the proposed protocol, the optimization engine at the edge server gives feedback to mobile AR users so that they can adapt their frame rate and video frame size, while the edge server adapts the computational model and resource allocation according to the wireless channel conditions. Depending on network conditions and computational needs, the result may affect the accuracy of object detection algorithms (e.g. objects far from the view of AR client are not recognized). Chen et al. [Zhuo Chen, Wenlu Hu, Junjue Wang, Siyan Zhao, Brandon Amos, Guanhang Wu, Kiryong Ha, Khalid Elgazzar, Padmanabhan Pillai, Roberta Klatzky, Daniel Siewiorek, and Mahadev Satyanarayanan. 2017. An empirical study of latency in an emerging class of edge computing applications for wearable cognitive assistance. In Proceedings of the Second ACM/IEEE Symposium on Edge Computing (SEC '17). ACM, New York, N.Y., USA.] consider cognitive wearable assistance to determine if a user has correctly performed a task and provide step-by-step guidance. The approaches are based on visual understanding of the scene and rely on offloading video from the mobile device.

For the use of augmented reality together with the handling of objects, a fast and accurate understanding of the environment is one key enabler. This task requires complex computations which mobile devices often cannot handle in view of the limited processing power. It is known to use 2D images such as RGB images to monitor the manipulation of an object by the user. However, such an approach has the drawback that the field of view in the augmented reality device is small and that external factors such as the lightening conditions impact the result. Furthermore, the situation depends on the fact where the user is looking at so that a not complete view of the complete scene is possible. Furthermore, the complexity of the complete scene can impact the accuracy of the object and the action recognition when relying on these images only.

Accordingly, a need exists to improve the situation and to especially improve the possibility to assist a user when manipulating an object, when the user is having a viewing apparatus onto which information from augmented reality can be added.

SUMMARY

This need is met by the features of the independent claims. Further aspects are described in the dependent claims.

According to a first aspect, a method for operating a monitoring unit is provided which is configured to monitor a manipulation of at least one object by a user. The method comprises the steps of receiving, via a cellular network, actual user position data comprising an actual position of the at least one portion of the user used to manipulate the at least one object wherein, furthermore, actual object position data are received comprising an actual position of the at least one object. For example, the user position can correspond to temporal and/or spatial coordinates that represent the hand positions of a user on an object. Furthermore, a matching is carried out in which the actual user position data is matched to predefined user position data provided at the monitoring unit, wherein the predefined user position data indicate a correct position of the at least one portion of the user for manipulating the at least one object. Furthermore, the actual object position data is matched to predefined object position data provided at the monitoring unit, wherein the predefined object position data indicate a correct position of the at least one object. Furthermore, it is determined based on the matching, whether the manipulation of the at least one object by the at least one portion of the user is correct or not.

With the method the monitoring unit can compare the actual portion of the user and the actual position of the at least one object of the portion of the user and of the object so that it can be determined whether the user is manipulating the object in the correct way.

Furthermore, the corresponding monitoring unit is provided comprising a memory and at least one processing unit wherein the memory contains instructions executable by the at least one processing unit so that the monitoring unit can operate as discussed above or as discussed in further detail below.

As an alternative, a monitoring unit is provided configured to monitor a manipulation of at least one object by a user, wherein the monitoring unit comprises a first module configured to receive via a cellular network actual user position data comprising an actual position of the at least one portion of the user used to manipulate the at least one object and configured to receive actual object position data comprising an actual position of the at least one object. Furthermore, a second module is provided configured to match the actual user position data to predefined user position data provided at the monitoring unit, wherein the predefined user position data indicate a correct position of the at least one portion of the user for manipulating the at least one object. This second module is furthermore configured to match the actual object position data to predefined object position data provided at the monitoring unit, wherein the predefined object position data indicate a correct position of the at least one object. The monitoring unit comprises a third module configured to determine based on the matching whether the manipulation of the at least one object by the at least one portion of the user is correct or not.

Furthermore, a viewing apparatus is provided for a user, the viewing apparatus comprising at least one lens through which the user visually perceives a field of view in which at least one object is located. The viewing apparatus comprises a projecting unit configured to protect information onto the lens so that the user wearing the viewing apparatus perceives the field of view to which the projected information is added. Furthermore, a receiver is provided configured to receive an instruction via a cellular network from a monitoring unit, wherein the instruction indicates how to manipulate the at least one object. The projecting unit is configured to translate the received instructions into operating information by which the user is informed whether the manipulation of the at least one object by the user is correct or not.

Furthermore, a system is provided comprising the monitoring unit and the viewing apparatus.

Additionally, a computer program comprising program code is provided wherein an execution of the program code causes the at least one processing unit of the monitoring unit to execute a method as discussed above or as explained in further detail below.

Finally, a carrier comprising the computer program is provided, wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION OF DRAWINGS

Figure 1:
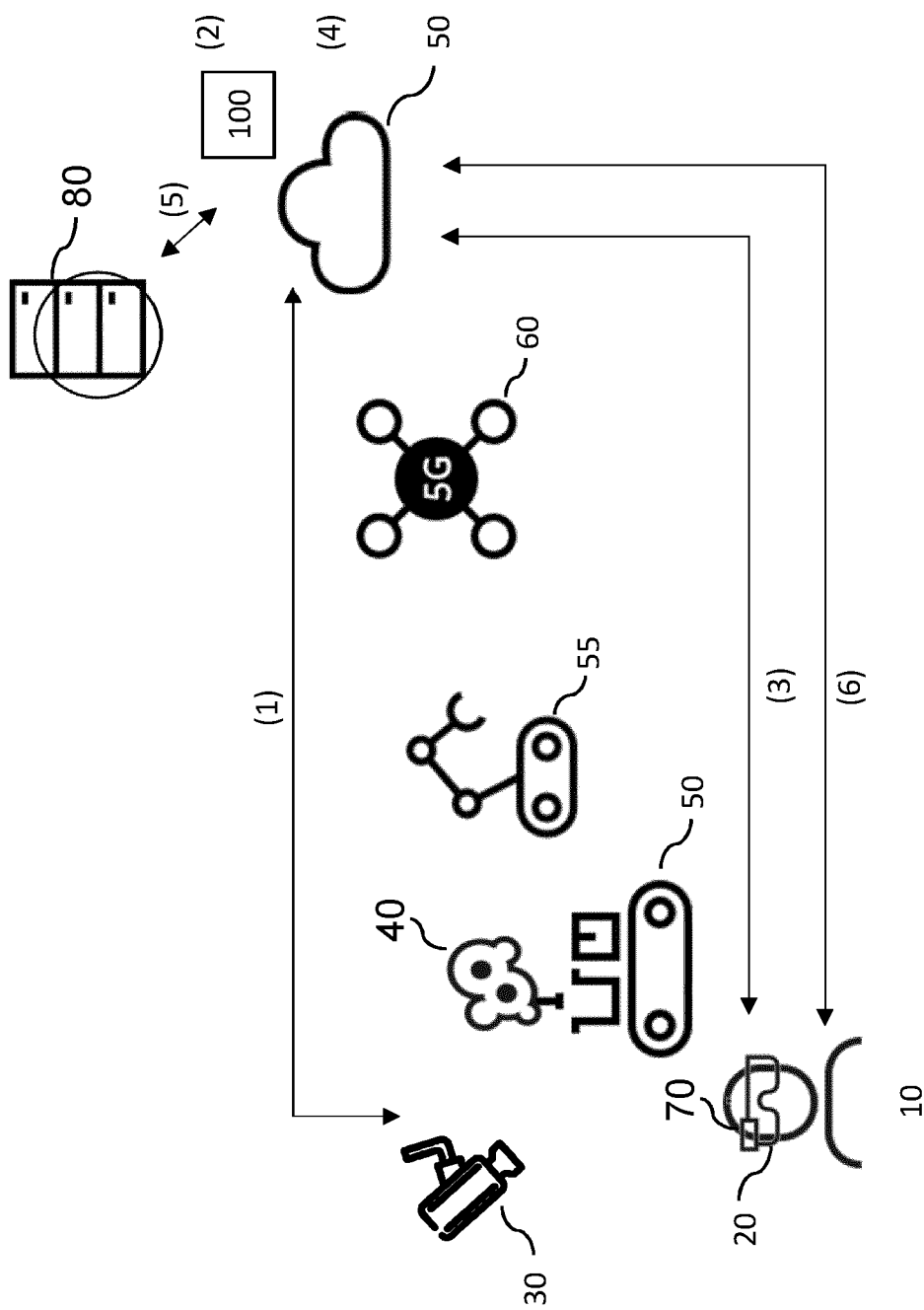
FIG. 1 shows a schematic architectural view of a system and a workflow in which object recognition and human action recognition is used to assist a user in the manipulation of an object.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function in general purpose becomes apparent to a person skilled in the art. Any connection or coupling between functional blocks, devices, components of physical or functional units shown in the drawings and described hereinafter may also be implemented by an indirect connection or coupling. The coupling between the components may be established over a wired or wireless connection. Functional blocks may be implemented in hardware, software, firmware, or a combination thereof.

As will be discussed below, a method is provided in which the human behavior is detected in an environment where a user is manipulating an object. Environment may be a smart factory or any other location. The behavior is detected by combining the human action recognition such as a hand tracking with object recognition algorithms in order to provide support for the user. The movement of at least a portion of the user such as the hand or any other part of the body is correlated with the identified objects with predefined user position data and predefined object position data in order to determine a correct or erroneous behavior. Furthermore, it is possible that instructions are provided to the user which is wearing a viewing apparatus such as a headset with an augmented reality feature, in the following called AR headset.

FIG. 1 shows a schematic architectural view and a workflow. A user 10 wearing a viewing apparatus such as the AR headset 20 should operate or manipulate an object such as object 40 indicated in FIG. 1. The object 40 may be manipulated by the user 10 together with other components 50, 55 such as a belt or a robot. The headset itself may comprise a first image sensor 70 which is directly positioned at the headset 20, however, it should be understood that the image sensor configured to generate 3D images of the environment of the user may also be located in the neighborhood of the user 10. The image sensor 70 may provide 3D images comprising a depth information.

Furthermore, another image sensor 30 is provided wherein this further image sensor is configured to generate images with 2D information such as RGB images. In the embodiment shown, the 3D image sensor 70 is provided at the user, wherein the 2D image sensor is fixedly installed. However, it should be understood that the 2D image sensor is provided at the user whereas the 2D image sensor is located in the neighborhood of the user. The 3D image sensor may be located at the headset or may be connected to gloves that the user is wearing for manipulating the object.

Furthermore, a cellular network 60 is provided via which the image data generated by the two image sensors are transmitted to a monitoring unit 100. The cellular network can be a mobile communication network, such as an LTE or 5G network. The monitoring unit 100 may be provided in the cloud as illustrated by reference numeral 50. Preferably, the monitoring unit is located at the edge of the cloud or at the edge of the mobile communications network or cellular network 60. The monitoring unit can include a frontend and a backend as shown later. The frontend may be located at the edge of the mobile communications or cellular network, wherein the backend can be located at an application outside the network 60. In another example, both the frontend and the backend are located at the edge of the cellular network. Furthermore it is possible that the monitoring unit 100 is not divided into different parts, but is provided as a one piece unit. The transmission of the image data from image sensor 30 is illustrated by arrow 1. At the monitoring unit 100 the object detection is carried out wherein artificial intelligence may be used for the object detection and recognition. Furthermore, any other known method for object detection may be used. This is shown by reference numeral 2. Furthermore, the image data from the second sensor 70 is also transmitted to the monitoring unit via the cellular network 60. When the image sensor provided at the user is providing the 3D data including the depth information, it is possible to detect in step 4 the interaction of the user, especially the tracking of the hand or any other part on the identified object. A database 80 may be provided which stores a manipulation plan which indicates which manipulation of the object should be carried out at what situation and which knows the correct positions of the user and the object during manipulation. For example, a database can correspond to a digital twin where physical objects and their associated digital data such as manipulation plan are stored. In step 5, it is possible to detect whether the manipulation of the user is in line with a desired manipulation as will be discussed in further detail below. This can include a matching process in which the actual user position is matched to a correct user position deduced from the database 80.

Summarizing, as shown in FIG. 1, 2D image data are provided by a first image sensor. The image data can comprise a video stream and the video data can be regular video data of the field of view or 360° video data. These data streams are used for the object recognition at the monitoring unit. Furthermore, depth images are provided by the second image sensor, these depth images are used for the human action recognition, by way of example the hand tracking on the identified objects. The 2D image sensor may be provided in the surrounding where the user is located or may be attached to the user. In the same way, the image sensor providing the depth information may be attached to the user or may be located such that it can provide images of the field of view where the user and the object are located. When the position of the user or of the part of the user manipulating the object is identified in the received images and when the object is identified, it is possible to check based on the database 80 whether the manipulation of the object by the user is correct or not. To this end, the database comprises a plurality of position sets, wherein each position set comprises a desired object position with a corresponding desired user position. Furthermore, the database has the exact sequence of the manipulating steps e.g. based on a task list provided to the database or based on a Jira ticket system.

As will be explained below, the 2D image data and the image data comprising the depth information are fused in order to generate fused image data wherein these fused image data comprise the actual position of the user and the actual position of the object in a common coordinate system. The fused image data are then compared to the position sets in the database 80 and the position set is identified which best matches the fused image data. Then it is checked whether the position of the user relative to the object to be manipulated is correct or not. The position set that best matches the used image data comprises an object position and a user position. When it is determined that the object and user, or part of the user (hand) position is in line with the next steps to be carried out by the user, the manipulation is corrected. Otherwise, it is not correct as the user may manipulate the wrong object or the right object in a wrong way.

The scenario shown in FIG. 1 can be used for different situations. In a first situation, the user is operating at a production line such as a car assembly line. The monitoring unit can check whether the manipulation as carried out by the user is correct or not. If it is correct, the monitoring unit may not provide a feedback at all. If it is not correct, the monitoring unit may inform the user accordingly, may transmit a notification that the manipulation is not correct and may even indicate the correct position for the manipulation, wherein this information can then be displayed to the user in the AR headset. Furthermore, it may be indicated that the manipulation is correct or instructions are given how the correct manipulation may look like as explained in FIG. 3.

In a further scenario, the user may simply use the image data for consulting the database about an object to be manipulated. Here, the database comprises additional information such as the exact definition of the object that is identified, additional parameters such as the temperature of the object, which part of a complete assembly the object belongs to etc. Accordingly, in this scenario more detailed information is provided about the object which describes the object in more detail, and this object information is then sent to the user and displayed to the user. This scenario can be part of a quality inspection or quality management where assistance is provided to the user in inspecting a site comprising several objects.

In a further scenario, the database 80 may be consulted for providing a state information about the identified object to the user. This can be state information at an assembly line or a diagnosis of the identified objects including any errors which are identified in the assembled object. This kind of state information is provided to the user on the AR headset. Accordingly the database can include quality information of parts and/or can include vehicle information at assembly lines. The database can thus be used for a quality inspection and/or for diagnosis of the object the user is looking at.

Figure 2:
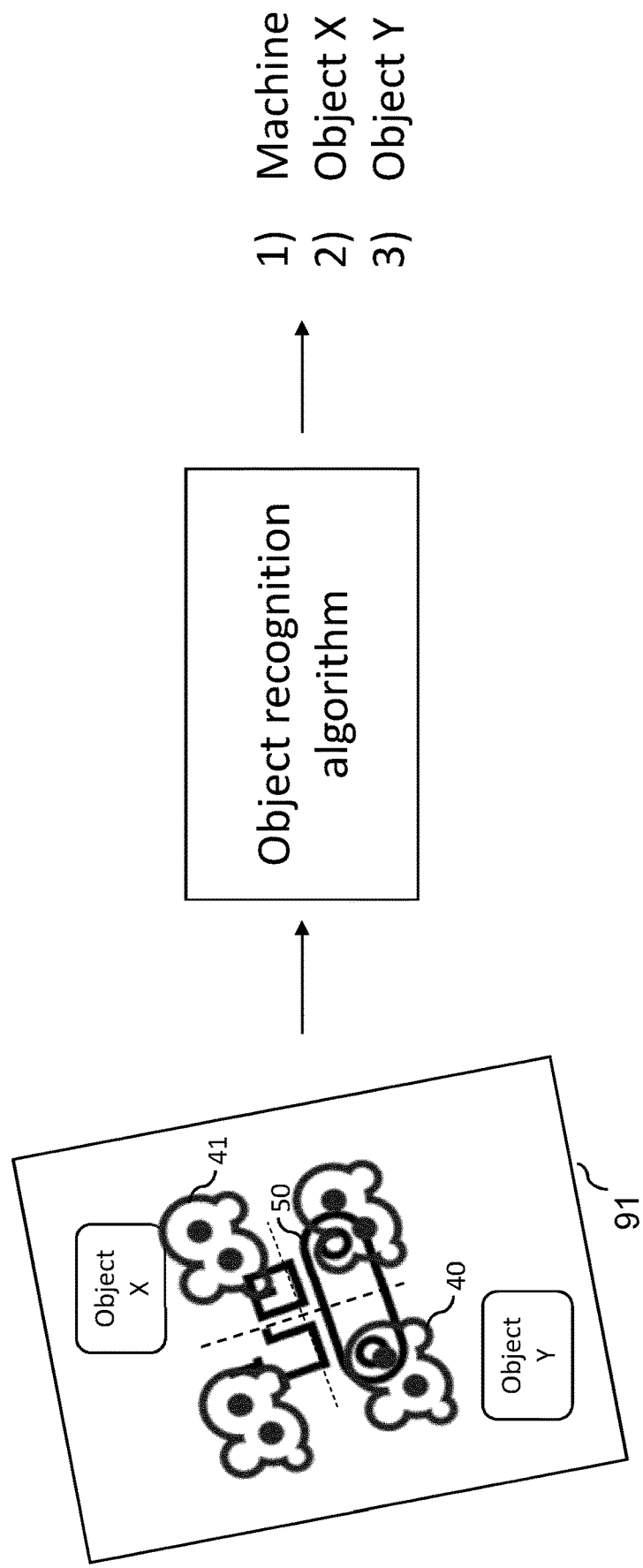
FIG. 2 shows an example schematic view of an image-based object recognition which might be used in the system of FIG. 1.

FIG. 2 summarizes an image-based object recognition which could be used to identify the objects in the 2D or 3D images provided to the monitoring unit. The monitoring unit receives the image 91, in the embodiment shown a 2D image. The image comprises a machine 50 and several objects such as object 40 or 41. The image 91 is then undergoing an object recognition algorithm as known in the art so that the machine 50 is identified and objects 40 and 41.

Figure 3:
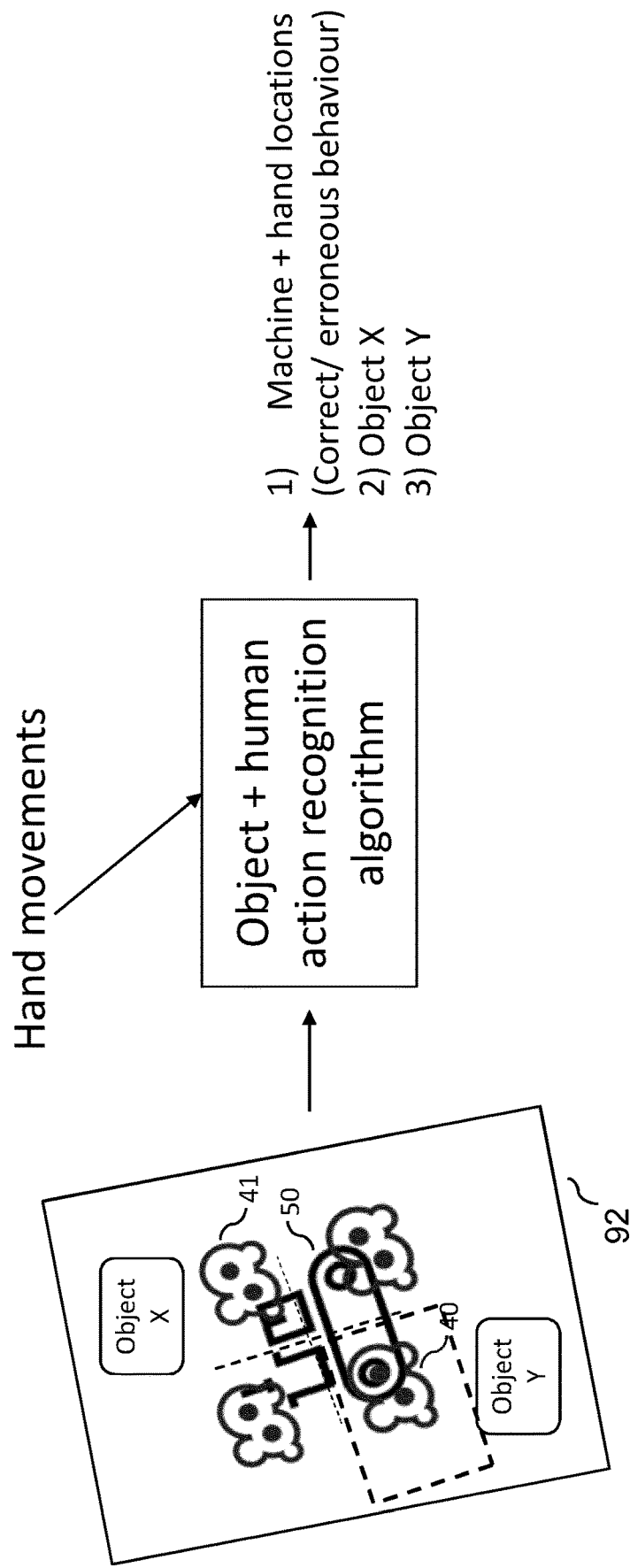
FIG. 3 shows how a combination of object and hand movement recognition can help to improve the correct manipulation of an object by the user by indicating a correct or erroneous behavior.

FIG. 3 shows how the object and human action recognition can be combined in order to indicate to the user where the correct manipulation should be carried out. An image 92 is an image that may be generated by the monitoring unit and can be the fused image generated based on image data from the 2D and the 3D image sensor. The image comprises the identified objects such as object 40 or 41 and machine 50. Further, the monitoring unit knows that object 40 should be manipulated. To this end, a kind of heat map may be generated which indicates to the user the correct object which is to be manipulated in the next step. In the embodiment shown, this is object 40 which is highlighted by the dashed square. The monitoring unit may divide the image into several sections or quadrants and if the hand movement matches the bottom left corner, then it resembles the correct behavior. The identification of the correct object to be manipulated, here object 40 can be determined based on the identified state of the machine 50 or may be determined based on prior image detection algorithms from where it is known which steps have already been carried out. As the monitoring unit comprises the correct sequence of the manipulating steps, the monitoring unit knows which step is to follow next.

In most of the examples give, the hand of the user is used as portion of the user manipulating the object. It should be understood that any other part of the user may be used.

Figure 4:
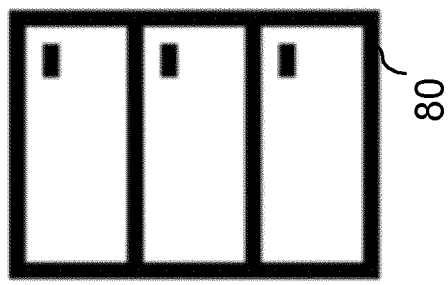
FIG. 4 shows a schematic view of how a database is set up in which it is stored whether the manipulation of an object by the user is correct or not.
Figure 4:
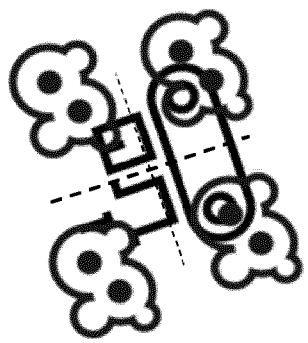
Figure 4:
Figure 4:
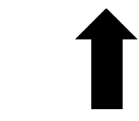
Figure 4:
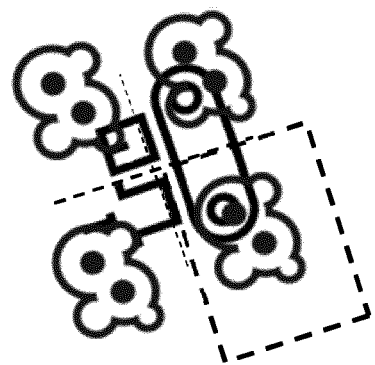
Figure 4:
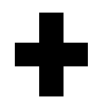
Figure 4:
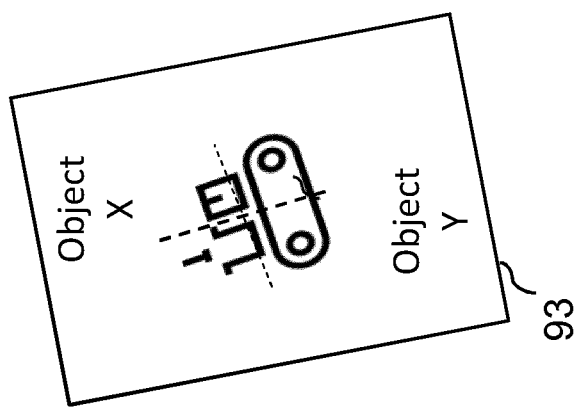
Figure 4:

FIG. 4 shows how to populate the database 80 based on the object recognition and the human action recognition, by way of example using the hand tracking algorithm. The recognized image, such as image 93, together with the different hand tracking options are provided as input. A labeling step is applied for a specific scenario to capture correct or erroneous behavior. For labeling, the database can be trained based on real-time data from the different settings provided in the environment such as the factory to capture the correct or erroneous behavior. Identified objects and hand movements can be represented by positions as 2D coordinates. The example shown in FIG. 4 comprises four inputs:
 object position bottom left, hand position top left, corresponding to an erroneous behavior,
 object position bottom left, hand position top right, erroneous behavior,
 object position bottom left, hand position bottom left, corresponding to the correct behavior,
 object position bottom left, hand position bottom right, erroneous behavior.

The database 80 can be manually or automatically updated to include such behavior and can furthermore include the additional information such as the diagnosis information or the quality information for certain objects as mentioned above. The object identification and the human action recognition can be enhanced with location information coming from the image sensors when determining the object at a specific location. The present application is not limited to hand tracking, for instance, a pointer tracking from the AR device or a gesture recognition might also be used. The same principle can be used to detect the actual parts or objects the user is inspecting so that the corresponding information can be provided from a database for the quality inspection and for the diagnosis.

Figure 5:
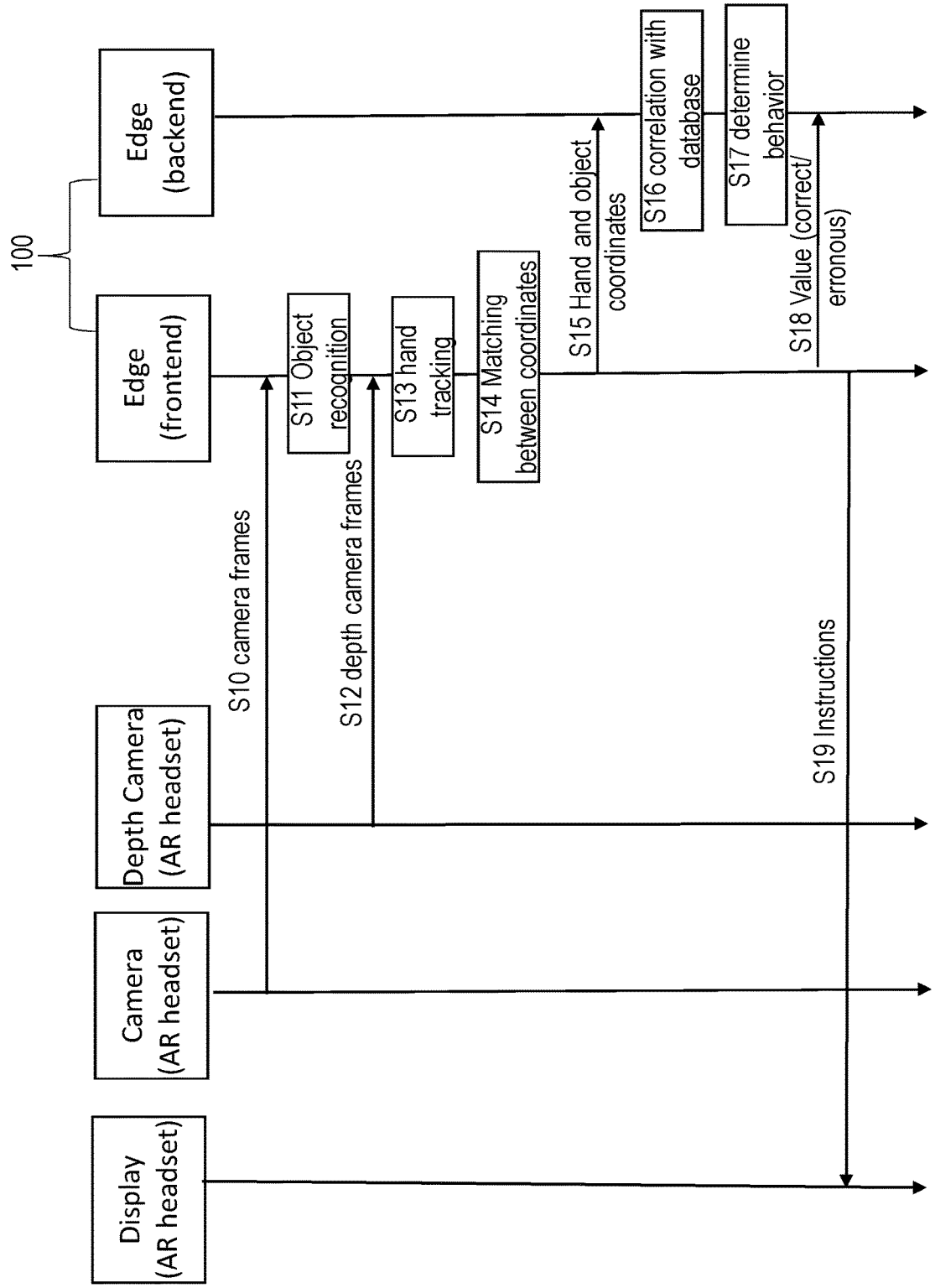
FIG. 5 shows an example message flow of the entities involved in which a 2D camera provided at the headset and a depth camera is used from the headset to assist in the manipulation of the object by the user.

FIG. 5 shows a first use case in which the 2D camera is provided at the headset and the image sensor providing the depth information is also provided at the headset. In step S10, the 2D images are fed to the monitoring unit which in the embodiment shown comprises two parts, a front end provided at the edge and a back end provided at the edge. The front end is then carrying out the object recognition in step S11. In step S12, the depth images are received from the image sensor providing the depth information. In step S13, the 3D hand tracking is carried out using the depth images and maybe the images of the 2D image sensor. In step S14, a matching is carried out between the coordinates from the images obtained in step S10 and S12. The object recognition in step S11 can furthermore return the label of the detected object and the rectangular region where the object is located as mentioned above. The region may be defined by two opposite corner points in the 2D image. The hand tracking algorithm then takes the depth images as input and returns the hand tracking points in the 3D coordinate space. The matching in step S14 between the 2D and 3D coordinates is performed based on perspective projection of 3D points to 2D. As projection planes, near and far clip planes may be selected based on the size of the closer environment which is calculated using the depth image. The near and far clip planes are imaginary planes used in rendering, wherein only objects are rendered located between these planes. The size of the environment can be determined based on the image comprising depth information and can be used to decide the location of these planes so that the projection is performed more accurately.

After matching the resulting 2D points for objects and the user part are provided as input to the back end in step S15. The input object and hand (user) coordinates are compared to the correct positions in the database in step S16 so that there is a correlation carried out between the hand and the objects in the database. This step S16 can include an input of 2D points for objects and hands or user parts which are correlated to the actual positions in the database. Here, a nearest neighbor k-means clustering algorithms may be used. Based on the correlation, the matching hand and the object locations in the database are determined and a correct or erroneous behavior is retrieved from the database in step S17. As explained above, the correct positions are determined for the current task and were added to the database before runtime. The result of the behavior is then transmitted to the front end part in step S18. If the behavior is correct no information may be provided to the user in the display. However, it is also possible that the correct behavior is displayed in a kind of heat map as discussed above, or if the behavior is wrong the correct behavior may be displayed as augmented reality to the user so that the user is informed how to carry out the next manipulation step.

The processing at the back end may use as an input the 2D object and hand positions and can use k-means or nearest neighbor algorithm or any other correlation algorithm to find the correct hand and object positions in the database. The correct or erroneous behavior is then determined based on the hand and object locations and based on the position sets comprising the desired object positions and the desired user positions. The notification transmitted in step S19 to the user can, in case of a correct behavior, comprise the information that the user has completed the task successfully and can provide instructions for the next task, or even no notification is sent. On the other hand, in case of an erroneous behavior, the type of error is detected and the user is notified about the error and instructions may be repeated until the task is completed.

Figure 6:
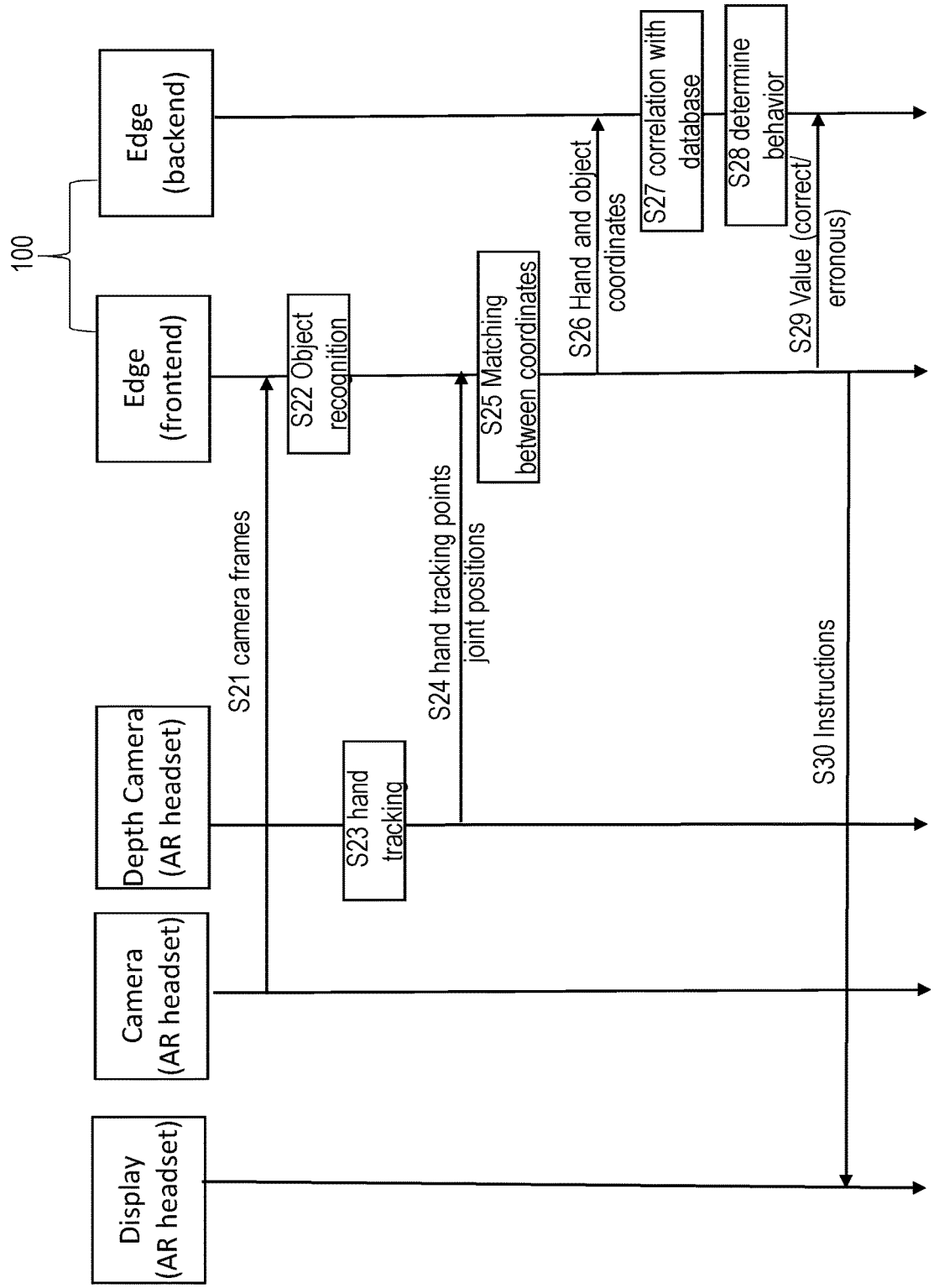
FIG. 6 shows an example message flow of the entities involved in which the 3D hand tracking is applied locally at the headset.

FIG. 6 shows a solution which is similar to the solution shown in FIG. 5. Steps S21 and S22 correspond to the steps S10 and S11 respectively. In step S23, the hand tracking points are calculated at the headset and sent to the edge in step S24. In step S25, a matching is carried out similar to step S14 and in steps S26 to S29 the same steps are carried out as in steps S15 to S18. Finally, as in the embodiment above, instructions are sent to the headset in step S30.

Figure 7:
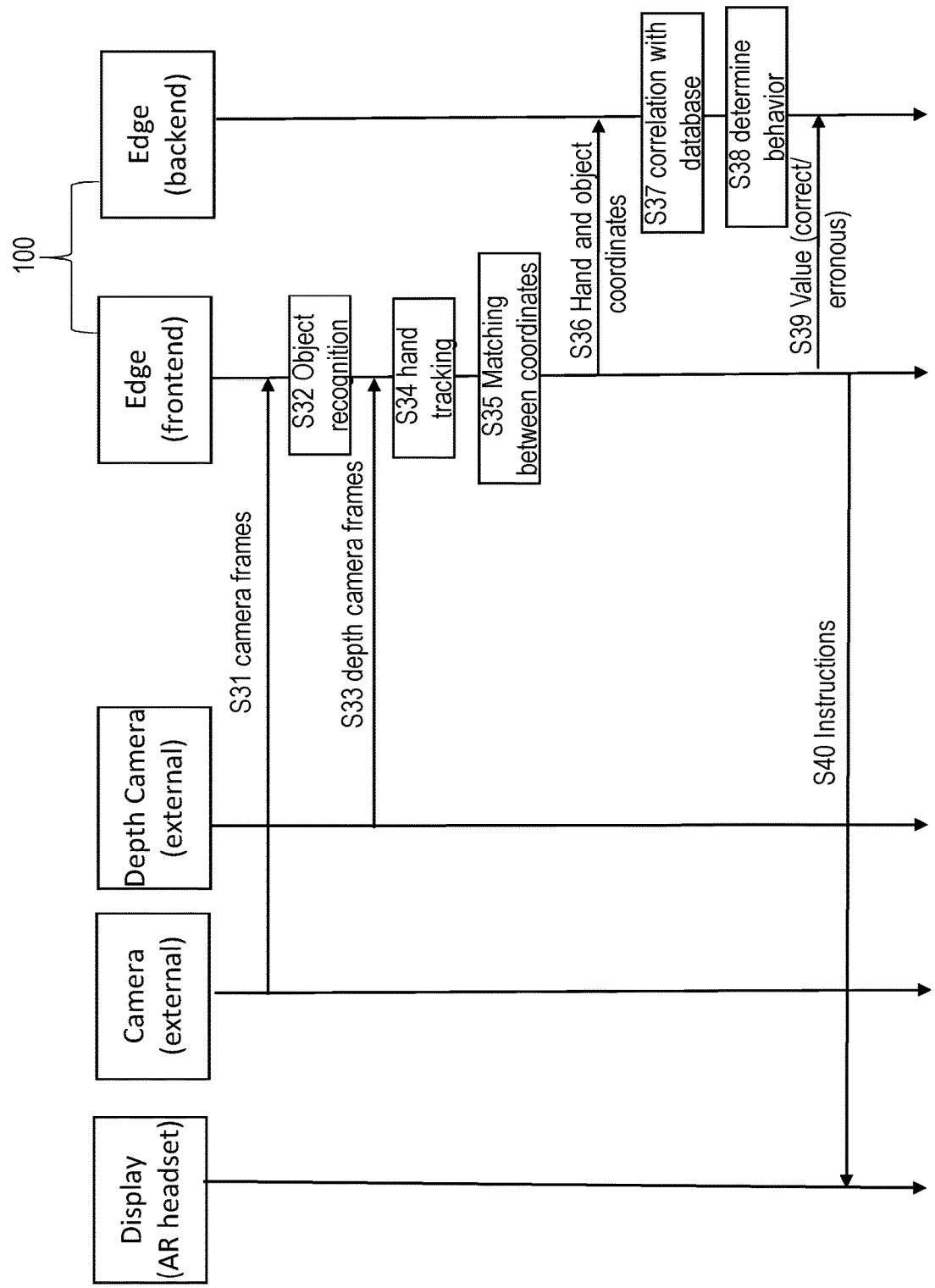
FIG. 7 shows an example message flow of the entities involved in which an external camera is used which generates depth images in order to assist the user in manipulating the object.

FIG. 7 shows a further solution where the 2D images are received from an external image sensor. In the same way, the 3D image data are received from an external 3D image sensor which is placed in the environment of the position of the user and the image frames are fed to the edge server as shown. Accordingly, steps S32 and S34 to S40 correspond to the steps shown in FIG. 5 or 6. In step S31, the 2D image data are received from the external camera and in step S33 the 3D image data are received from an external 3D image sensor.

Figure 8:
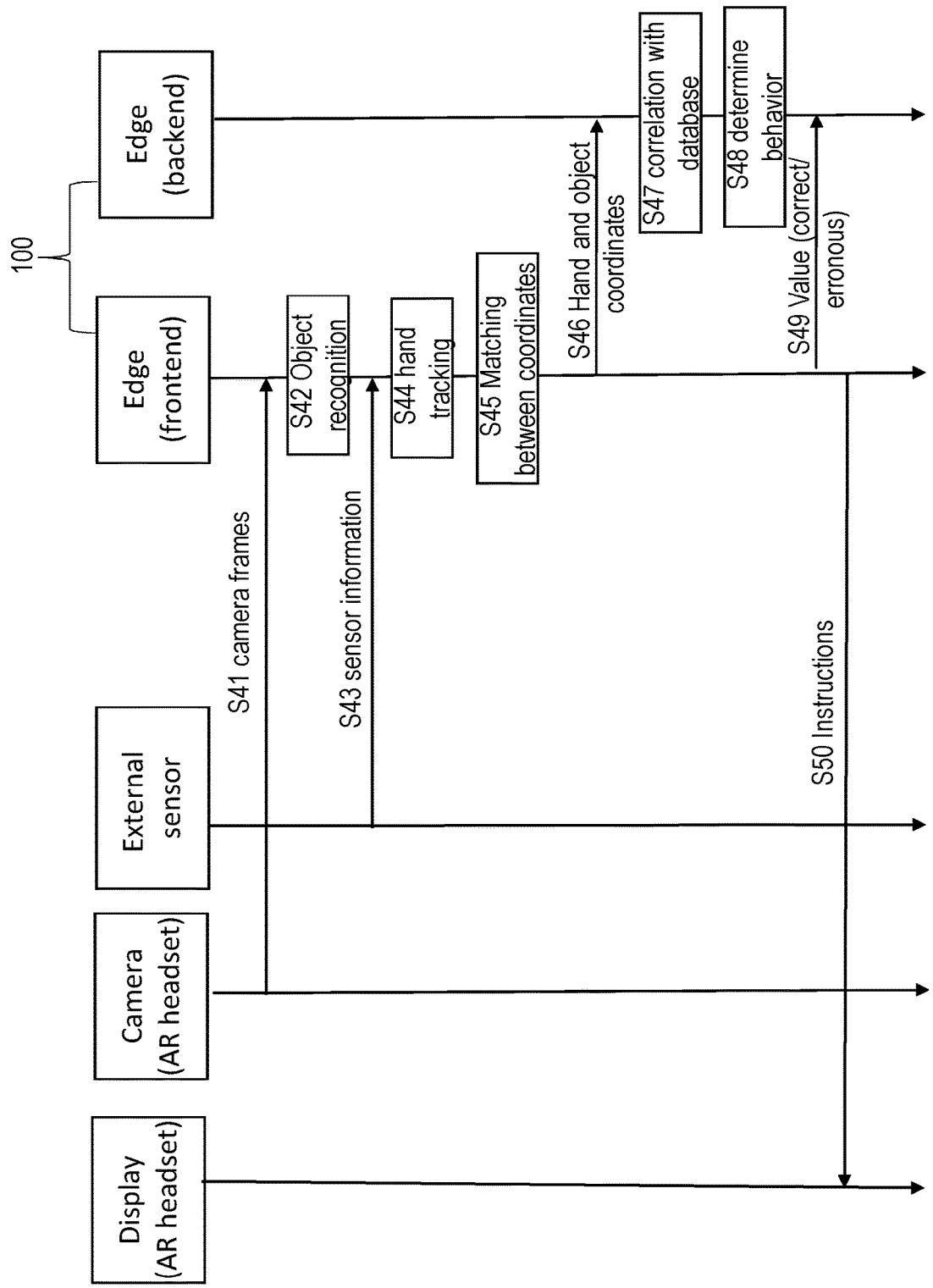
FIG. 8 shows an example message flow of the entities involved in which 2D images from the headset and hand tracking points from an external device such as a glove is used to assist the user in manipulating the object.

FIG. 8 shows an example where the 2D image data originate from the headset in step S41. The 3D image data are received from an external 3D sensor in step S43. The other steps S42 and S44 to S50 correspond to the corresponding steps shown in FIG. 5.

Figure 9:
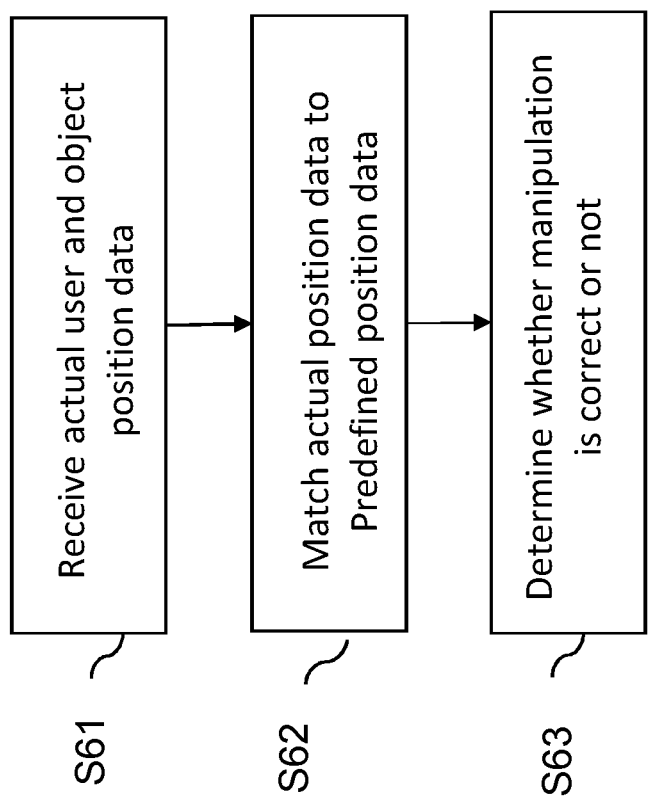
FIG. 9 shows an example flowchart of a method carried out by the monitoring unit when assisting a user in a manipulation of an object by indicating whether the manipulation is correct or not.

FIG. 9 summarizes some of the steps carried out by the monitoring unit in the above-discussed process. In step S61, the monitoring unit receives the actual user and the actual object position data as determined by the different image sensors. In step S62, a matching is carried out in which the actual position data is matched to the predefined user position data, wherein the predefined user position data indicate the correct position of the user or of the portion of the user handling the object, and the actual object position data are matched to predefined object position data which indicate the correct position of the object. In step S63, based on the matching, it is determined whether the manipulation of the user is correct or not.

Figure 10:
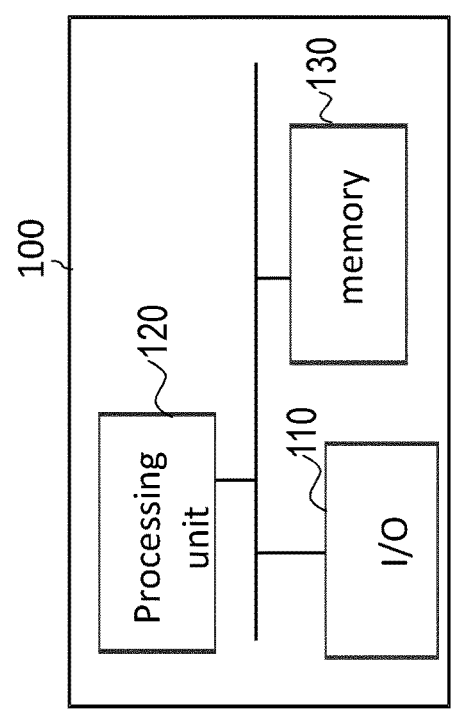
FIG. 10 shows an example schematic representation of the monitoring unit configured to assist the user in the manipulation of the object.

FIG. 10 shows a schematic architectural view of the monitoring unit 100 which can carry out the above-discussed monitoring. The monitoring unit 100 may be a single unit or may be distributed in the edge with a front end and a back end as discussed in connection with FIGS. 6 to 9. The monitoring unit comprises an interface or input output 110 configured to receive image data or control messages and configured to transmit image data and/or control messages. The received image data can comprise the image data from the 2D image sensor and the 3D image sensor. The interface 110 can furthermore provide instructions to the user, wherein the generated instructions can comprise the information of the correct or wrong behavior and can comprise more detailed information what the correct behavior is. The monitoring unit furthermore comprises a processing unit 120 which is responsible for the operation of the monitoring unit 100. The processing unit 120 comprises one or more processors and can carry out instructions stored on a memory 130. The memory can include a read-only memory, a random access memory, a mass storage, a hard disk, or the like. The memory 130 can furthermore include suitable program code to be executed by the processing unit 120 so as to implement the above-described functionalities in which the entities involved.

Figure 11:
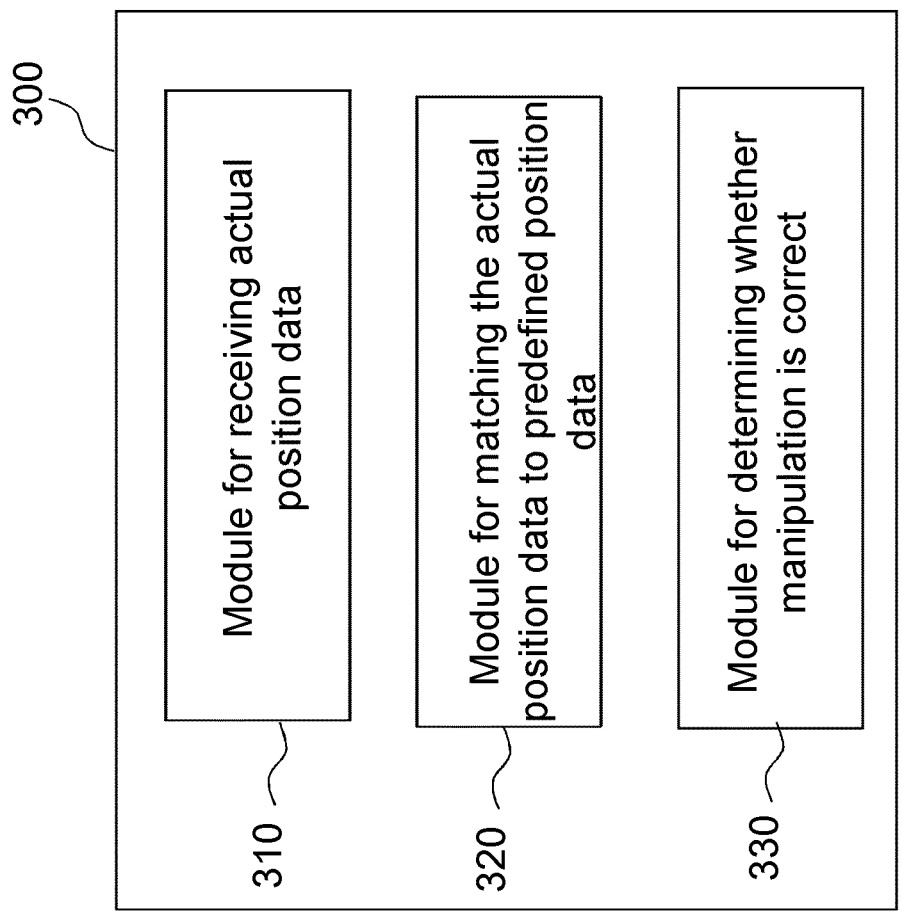
FIG. 11 shows another example schematic representation of the monitoring unit configured to assist the user in the manipulation of the object.

FIG. 11 shows another schematic architectural view of a further embodiment of the monitoring unit 300 which comprises a first module 310 configured to receive the actual user data with the actual position of the user and the actual object position. A module 320 is provided configured to match the actual position data to the predefined position data and a module 330 can be provided to determine, based on the matching, whether the manipulation of the object by the user is correct or not.

From the above said some general conclusions can be drawn.

For determining, whether the manipulation is correct or not, it is possible to determine that the manipulation of the at least one object is not correct when the actual user position data differ from the predefined user position data by more than a threshold. In this case, a notification can be transmitted to the user over the cellular network that the manipulation is not correct. Applied to the example shown in FIG. 3, this means that if the user's hand is not in the lower left quadrant where object 40 is located, it may be determined that the user has the intention to manipulate the wrong object.

Furthermore, the monitoring unit may determine in a sequence of steps to be carried out by the user a next step to be carried out by the user and a next position of the at least one portion of the user in the next step. The matching then comprises the step of determining whether the actual user position data are in agreement with the next position. The monitoring unit may have monitored the different actions by the user and knows which of the manipulation steps has to be carried out in the next step. Accordingly, the next position the user should take is known and the matching comprises the step of determining whether the user is actually moving close to the position which was determined as the next position and is doing in the right manipulation.

Furthermore, it is possible that, based on the matching step, an instruction is generated for the user how to manipulate the at least one object and this is instruction is then sent to the user.

It is possible to divide the environment which is reachable by the user into different sections, such as the four sections shown in FIG. 3. These different sections then comprise a preferred section, in FIG. 3 the left lower section in which the correct position of the at least one portion of the user should be located. The information about the preferred section is then transmitted to the user so that this information can be displayed to the user as augmented reality in the AR headset.

Furthermore, it is possible that a more detailed information about the at least one object is determined which describes the at least one object in more detail and this more detailed information is also transmitted to the user.

For the matching the actual user position data to the predefined user position data, the following steps may be carried out:

an actual object position is determined from the received actual object position data and an actual user position is determined from the actual user position data. The actual object position and the actual user position are then compared to a plurality of position sets. Each position set can comprise a desired object position and a corresponding desired user position the comparing is used in order to find the position set best matching the actual user position and the actual object position and the best matching position set comprises best matching position of the portion of the user and a best matching position of the object. Furthermore, it is determined in a sequence of steps to be carried out by the user the next step to be carried out by the user and a next position of the user in this next step. Furthermore, it is determined whether the next position is within a threshold distance to the best matching position of the portion to the user. As discussed in connection with FIG. 3, the monitoring unit knows the next manipulation step to be carried out. The image can then be divided into different sections and the position sets comprise for the different manipulation steps the desired object position and the desired user position. In FIG. 3, it was the lower left corner for the object 40 and for the position of the user. The actual object position and the actual user position are then compared to these different position sets. The best matching position set comprises then information about the manipulation the user is probably carrying out in the near future. When the monitoring unit knows what is the next step to be carried out by the user, it can be determined whether the manipulation as detected from the image is in line with the expected behavior. If there is more than a threshold distance between the actual user position and the desired position, by way of example if the user's hand is not in the lower left section shown in FIG. 3, it may be determined that the behavior of the user is not correct.

Furthermore, it is possible to indicate the next position the user should take for the manipulation of the object to the user.

The matching step of the actual user position data to the predefined user position can comprise methods such as nearest neighbor clustering or k-means clustering.

Furthermore, it is possible to collect the predefined object position data and the predefined user position data including monitoring a plurality of user manipulations in which the user is manipulating the at least one object in a sequence of steps. The populating of the database was discussed above inter alia in FIG. 4.

The above-mentioned steps have been mainly carried out in the back end part of the monitoring unit. If it is considered that the monitoring unit also comprises the front end, the monitoring unit also receives first image data generated by the first image sensor which comprises the 2D images of the user and its direct environment. The monitoring unit further receives the second image data generated by a second image sensor which is different from the first image sensor and which comprises further images comprising an additional depth information. The monitoring unit generates fused image data based on the first image data and the second image data in a common coordinate system wherein the fused image data comprise the actual position of the user or at least the portion of the user and which comprise the actual position of the at least one object in the common coordinate system. When the actual user position data and the actual object position data are received, the fused image data are received.

The actual position of the user or of the portion of the user is determined based on the second image data, namely the 3D image data wherein the actual position of the at least one object may be determined based on the first image data, the 2D image data. The fused image data may also be implemented as 2D image data.

The receiving of the image data and the generation of the fused image may be carried out by a first part of the monitoring unit wherein the matching and the determining whether the manipulation of the user is correct or not may be carried out by a second part of the monitoring unit which can be located at another location.

Summarizing, a method is provided for determining a behavior of a user and for especially determining whether the user is correctly or erroneously manipulating an object. Furthermore, support is provided for the user wearing the headset. The method can use algorithms for object recognition and human action recognition, such as the hand tracking to build and consult a back end system, here the monitoring unit at real-time in order to track the user's behavior. Furthermore, feedback can be provided to the user whether the behavior or the manipulation is correct or not.

The invention claimed is:

1. A method for operating a monitoring unit configured to monitor a manipulation of at least a first object by a user, the method comprising:
   receiving, via a cellular network, i) actual user position data comprising an actual position of at least a first portion of the user, wherein the first portion of the user is used to manipulate the first object, and ii) actual object position data comprising an actual position of the first object;
   using i) the actual user position data and the actual object position data and ii) a task list and information indicating the last task performed, selecting a position set from a database of position sets and retrieving the selected position set, wherein the retrieved position set comprises:
   a) predefined user position data indicating a correct position of the first portion of the user for manipulating the first object, and
   b) predefined object position data indicating a correct position of the first object; and
   determining, based on the predefined user position data and the predefined object position data included in the retrieved position set, whether the position of the first portion of the user relative to the object to be manipulated is correct.

2. The method of claim 1, wherein determining whether the manipulation is correct or not comprises determining that the manipulation of the first object is not correct when the actual user position data differ from the predefined user position data by more than a threshold, wherein a notification is transmitted to the user over the network that the manipulation is not correct.

3. The method of claim 1, further comprising determining in a sequence of steps to be carried out by the user a next step to be carried out by user, a next position of the first portion of the user in the next step, wherein the selecting comprises determining whether the actual user position data are in agreement with the next position.

4. The method of claim 1, further comprising determining, based on the retrieved position set, an instruction for the user how to manipulate the first object, wherein the instruction is sent to the user.

5. The method of claim 4, further comprising dividing an environment reachable by the user into different sections, the different sections comprising a preferred section in which the correct position of the first portion of the user is located, wherein information about the preferred section is transmitted to the user such that the information about the preferred section can be displayed to the user as augmented reality.

6. The method of claim 1, further comprising determining more detailed information about the first object describing the first object in more detail, wherein the more detailed information is sent to the user.

7. The method of claim 1, wherein the selecting comprises:
    determining, in a sequence of steps to be carried out by the user the next step to be carried out by user, a next position of the first portion of the user in the next step; and
    determining whether the next position is within a threshold distance to a best matching position of the portion of the user.

8. The method of claim 7, further comprising indicating to the user the next position of the first portion of the user.

9. The method of claim 1, wherein the selecting comprises at least one of a nearest neighbor clustering and a k-means clustering.

10. The method of claim 1, further comprising collecting the predefined object position data and the predefined user position data including monitoring a plurality of user manipulating the first object in a sequence of steps.

11. The method of claim 1, further comprising:
    receiving first image data generated by first image sensor comprising 2 dimensional images of the user and its direct environment,
    receiving second image data generated by a second image sensor different from the first image sensor, the second image data comprising further images comprising an additional depth information,
    generating fused image data based on the first image data and the second image data in a common coordinate system, the fused image data comprising the actual position of the first portion of the user and the actual position of the first object in the common coordinate system, wherein receiving the actual user position data and the actual object position data comprises receiving the fused image data.

12. The method of claim 11, wherein the actual position of the first portion is determined based on the second image data, wherein the actual position of the first object is determined based on the first image data.

13. The method of claim 11, wherein the fused image data are 2 dimensional image data.

14. A non-transitory computer readable medium storing a computer program comprising program code to be executed by at least one processing unit of a monitoring unit, wherein execution of the program code causes the monitoring unit to perform the method of claim 1.

15. A monitoring unit configured to monitor a manipulation of at least a first object by a user, the monitoring unit comprising:
    a memory; and
    at least one processing unit, the memory containing instructions executable by the at least one processing unit, wherein the monitoring unit is operative to perform a method comprising:
    receiving, via a cellular network, i) actual user position data comprising an actual position of at least a first portion of the user, wherein the first portion of the user is used to manipulate the first object, and ii) actual object position data comprising an actual position of the first object;
    using i) the actual user position data and the actual object position data and ii) a task list and information indicating the last task performed, selecting a position set from a database of position sets and retrieving the selected position set, wherein the retrieved position set comprises:
        a) predefined user position data indicating a correct position of the first portion of the user for manipulating the first object, and
        b) predefined object position data indicating a correct position of the first object; and
    determining, based on the predefined user position data and the predefined object position data included in the retrieved position set, whether the position of the first portion of the user relative to the object to be manipulated is correct.

16. The monitoring unit of claim 15, further being operative, for determining whether the manipulation is correct or not, to determine that the manipulation of the first object is not correct when the actual user position data differ from the predefined user position data by more than a threshold, and to transmit a notification to the user over the network that the manipulation is not correct.

17. The monitoring unit of claim 15, further being operative to determine in a sequence of steps to be carried out by the user a next step to be carried out by user, a next position of the first portion of the user in the next step, and to determine whether the actual user position data are in agreement with the next position.

18. The monitoring unit of claim 15, further being operative, to determine, based on the retrieved position set, an instruction for the user how to manipulate the first object, and to send the instruction to the user.

19. The monitoring unit claim 15, comprising a first monitoring module and a second monitoring module, wherein the first monitoring module is operative to receive the actual user position data and the actual object position data, and to carry out the selecting, wherein the second monitoring module is operative to receive the first and second image data and to generate the fused image data.

* * * * *